United States Patent
Canato (10) Patent No.: US 12,539,730 B2
(45) Date of Patent: Feb. 3, 2026

(54) ROAD VEHICLE PROVIDED WITH AN AIR CONDITIONING SYSTEM OF THE PASSENGER COMPARTMENT

(71) Applicant: FERRARI S.P.A., Modena (IT)

(72) Inventor: Gianpaolo Canato, Modena (IT)

(73) Assignee: FERRARI S.P.A., Modena (IT)

( * ) Notice: Subject to any disclaimer, the term of this patent is extended or adjusted under 35 U.S.C. 154(b) by 392 days.

(21) Appl. No.: 18/178,904

(22) Filed: Mar. 6, 2023

(65) Prior Publication Data
US 2023/0286350 A1    Sep. 14, 2023

(30) Foreign Application Priority Data

Mar. 10, 2022 (IT) .................. 102022000004622

(51) Int. Cl.
*B60H 1/00* (2006.01)
(52) U.S. Cl.
CPC ..... *B60H 1/00028* (2013.01); *B60H 1/00285* (2013.01); *B60H 1/00671* (2013.01); *B60H 2001/00092* (2013.01); *B60H 2001/00192* (2013.01)
(58) Field of Classification Search
CPC .............. B60H 1/244; B60H 2001/002; B60H 1/00028; B60H 1/00285
USPC .......................................................... 454/69
See application file for complete search history.

(56) References Cited

U.S. PATENT DOCUMENTS

| | | |
|---|---|---|
| 3,550,522 A | 12/1970 | Bauer |
| 5,715,997 A * | 2/1998 | Ito .......................... B60H 1/247 165/203 |
| 6,715,814 B1 * | 4/2004 | Hoyle ................ B60H 1/00564 296/24.36 |

FOREIGN PATENT DOCUMENTS

| | | | |
|---|---|---|---|
| DE | 102018214560 A1 | 3/2020 | |
| EP | 2500192 A1 | 9/2012 | |
| WO | WO-9629211 A1 * | 9/1996 | ......... B60H 1/00064 |

OTHER PUBLICATIONS

Italian Search Report for Application No. 102022000004622; Filing Date: Mar. 10, 2022; Date of Mailing—Oct. 26, 2022, 8 pages.

* cited by examiner

*Primary Examiner* — Allen R. B. Schult
*Assistant Examiner* — William C Weinert
(74) *Attorney, Agent, or Firm* — CANTOR COLBURN LLP (57) ABSTRACT

A road vehicle having: a passenger compartment in which a transmission tunnel is present, a right rear seat and a left rear seat; and an air conditioning system of the passenger compartment. The air conditioning system has: a rear body that is arranged in the centre of the passenger compartment at the transmission tunnel and in front of the rear seats; two air vents that are obtained in the rear body and are arranged side by side one towards the right and one towards the left, respectively; an air treatment unit that is connected to the two air vents; a single common supply duct that originates from the air treatment unit; a bifurcation that connects the common supply duct to the two air vents; a blade that is arranged in the area of the bifurcation and is movable between a completely closed position of a right branch of the bifurcation and a completely closed position of a left branch of the bifurcation; and an electric actuator configured to move the blade.

13 Claims, 6 Drawing Sheets

ROAD VEHICLE PROVIDED WITH AN AIR CONDITIONING SYSTEM OF THE PASSENGER COMPARTMENT

CROSS-REFERENCE TO RELATED APPLICATIONS

This application claims priority from the Italian patent application no. 102022000004622 filed on Mar. 10, 2022, the entire disclosure of which is incorporated herein by reference.

TECHNICAL FIELD

The present invention relates to a road vehicle provided with an air conditioning system of the passenger compartment.

PRIOR ART

The air conditioning system for a passenger compartment of a road vehicle introduces treated (heated, cooled, dehumidified, and/or filtered) air into the passenger compartment according to the passengers' preferences. For this purpose, the air conditioning system comprises an air treatment unit, which is adapted to treat the air that is subsequently introduced into the passenger compartment through a series of air vents present in the passenger compartment itself.

Generally, in order to be able to independently adjust the treated air introduced by two side by side air vents, two separate supply ducts are used, each of which originates from the air treatment unit and ends in a corresponding air vent. However, this solution poses major space problems in the case of the rear air vents in a front-engine and rear-wheel-drive vehicle as the available space along the transmission tunnel (which runs longitudinally through the road vehicle from the front to the rear) in which to position the two separate supply ducts is small.

The patent application EP2500192A1 describes an air conditioning system of a vehicle comprising two central outlet vents and two lateral outlet vents arranged in the instrument panel. The adjustment of the flow rate of air flowing out of the four outlet vents is adjusted by three hinged blades.

The patent application DE102018214560A1 describes an end part of an air conditioning system for a passenger compartment of a vehicle, in which two overlapping outlet vents are provided; the flow rate of air flowing out of the two overlapping outlet vents is adjusted by a hinged blade arranged upstream of the two outlet vents.

DESCRIPTION OF THE INVENTION

The purpose of the present invention is to provide a road vehicle provided with an air conditioning system of the passenger compartment that is free of the drawbacks described above and is, at the same time, easy and inexpensive to produce.

According to the present invention a road vehicle provided with an air conditioning system of the passenger compartment is provided, according to what is claimed by the appended claims.

The claims describe preferred embodiments of the present invention forming an integral part of the present description.

BRIEF DESCRIPTION OF THE DRAWINGS

The present invention will now be described with reference to the appended drawings, which illustrate a non-limiting example embodiment thereof.

PREFERRED EMBODIMENTS OF THE INVENTION

Figure 1:
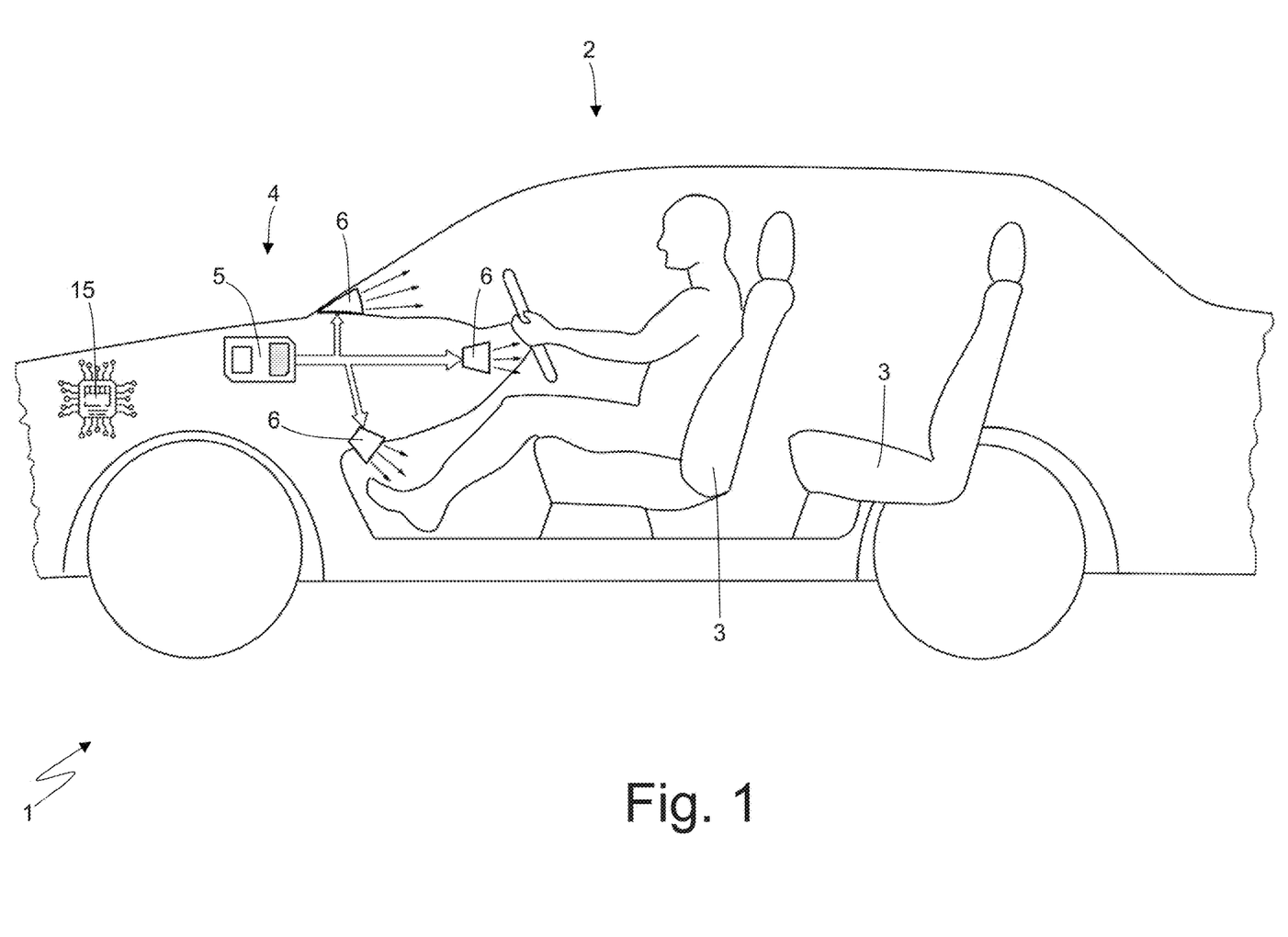
FIG. 1 is a schematic view of an automobile provided with an air conditioning system and produced in accordance with the present invention.

In FIG. 1, the number 1 denotes as a whole a road vehicle (in particular an automobile) provided with two driven (namely, non-driving) front wheels and with two driving rear wheels. An internal combustion engine is arranged in the front position, which produces torque that is transmitted to the driving wheels by means of a transmission.

The road vehicle 1 comprises a passenger compartment 2 that is provided with multiple seats 3 each adapted to accommodate a corresponding occupant; namely, there is always a place for a driver in the passenger compartment 2 to which passengers can be added (whose presence is, of course, optional).

The road vehicle 1 comprises an air conditioning system 4 provided with an air treatment unit 5 adapted to treat (heat, cool, dehumidify and/or filter) the air that must be introduced into the passenger compartment 2. A plurality of air vents 6 are connected to the air treatment unit 5, which air vents have the function of introducing the air treated by the air treatment unit 5 into the passenger compartment 2 and are distributed within the passenger compartment 2 in order to be able to introduce the air into different areas of the passenger compartment 2 itself.

Figure 2:
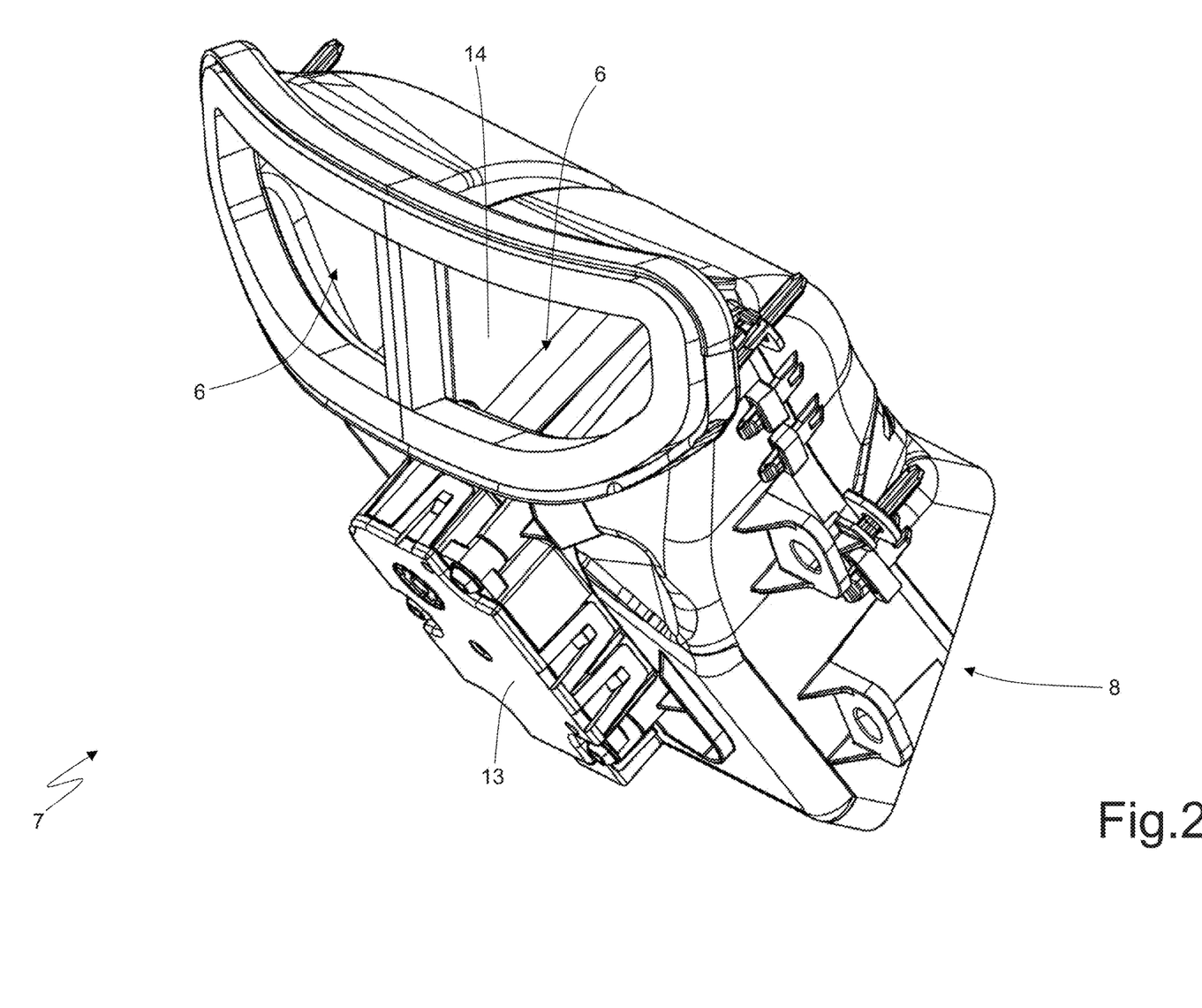
FIG. 2 is a perspective view of a rear body of the air conditioning system of FIG. 1.

According to what is illustrated in FIG. 2, two twin rear air vents 6 are arranged in front of the two rear seats 3 and in a central position (namely, in the area of the transmission tunnel T that is schematically illustrated in FIG. 1 and runs longitudinally through the passenger compartment 2 from front to rear), which are arranged side by side and are directed one towards a right side of the passenger compartment 2 (namely, towards the right rear seat 3 and obviously arranged on the right side) and the other towards a left side of the passenger compartment 2 (namely, towards the left rear seat 3 and obviously arranged on the left side). In particular, the two rear air vents 6 are obtained in a rear body 7 arranged in the centre of the passenger compartment 2 in the area of the transmission tunnel T.

Figure 4:
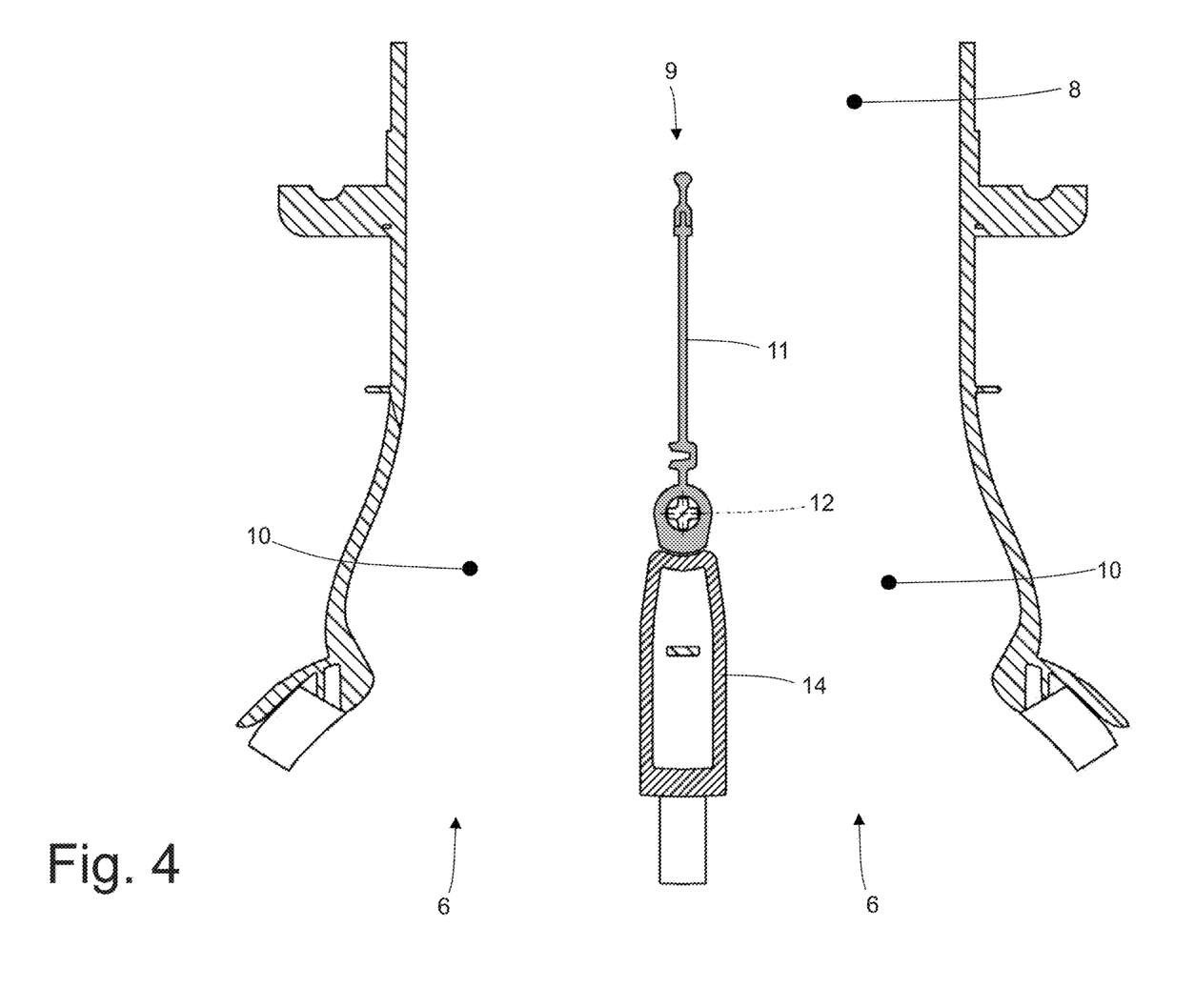
FIG. 4 is a sectional view with parts removed for clarity of the rear body of FIG. 2.

According to what is illustrated in FIG. 4, the air treatment unit 5 is connected to the two rear air vents 6 to supply treated air to the two rear air vents 6 by means of a single common supply duct 8. The common supply duct 8 originates from the air treatment unit 5 and ends in a bifurcation 9 that has two branches 10, each of which is connected to a corresponding rear air vent 6. Namely, the bifurcation 9 connects the common supply duct 8 to the two rear air vents 6 and has a right branch 10 which ends in a right rear air vent 6 and a left branch 10 which ends in a left rear air vent 6.

Figure 5:
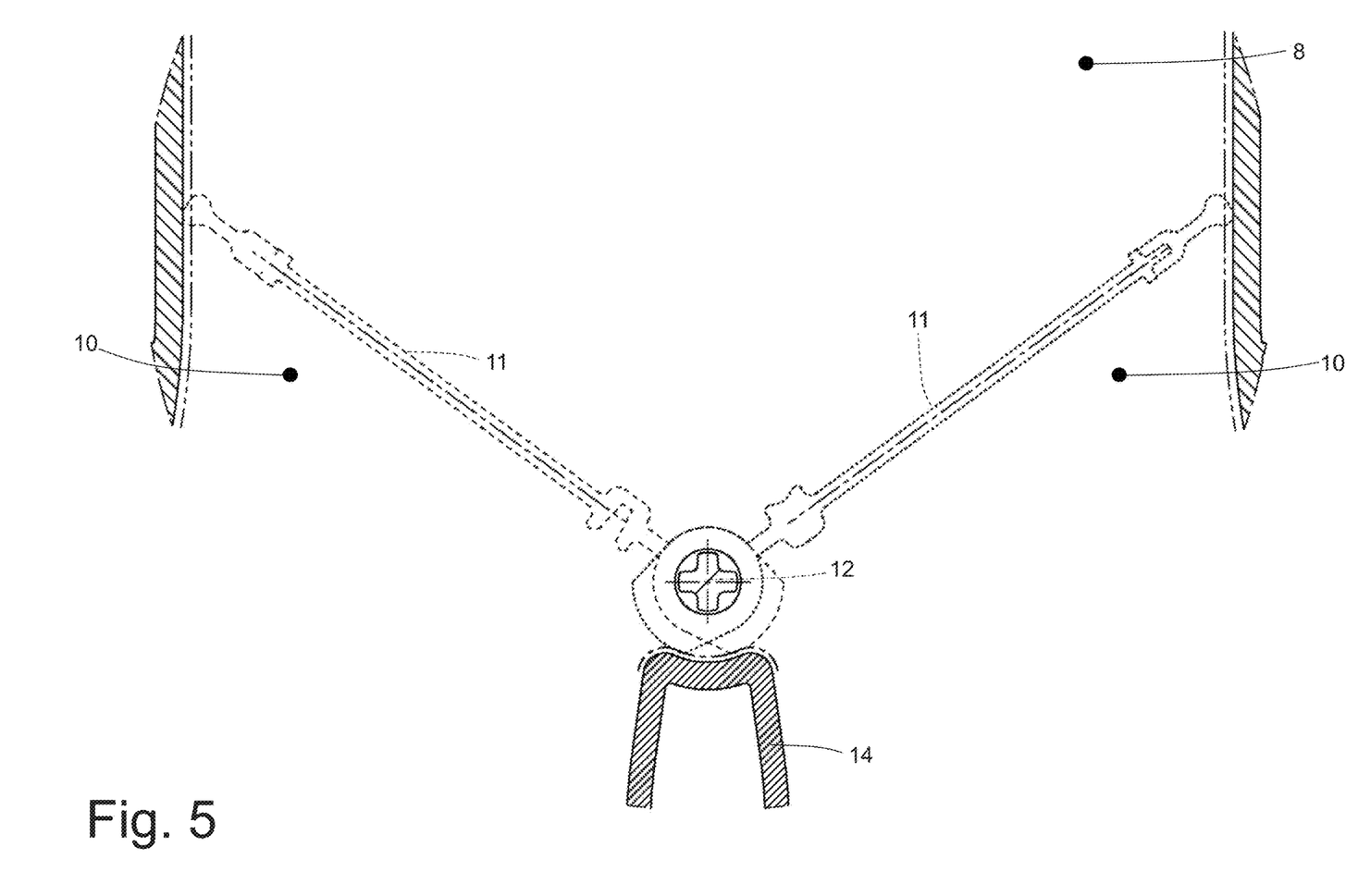
FIG. 5 is a sectional view with parts removed for clarity of a blade of the rear body of FIG. 2 in two different positions.

The air conditioning system 4 comprises a blade 11 that is arranged in the area of the bifurcation 9 and is mounted movably between a completely closed position (illustrated in FIGS. 5 and 8) of the right branch 10 of the bifurcation 9 (namely, the right rear air vent 6) and a completely closed position (illustrated in FIGS. 5 and 7) of the left branch 10 of the bifurcation 9 (namely, the left rear air vent 6). According to a preferred embodiment, the blade 11 is hinged in order to rotate around a rotation axis 12 between the completely closed position of the right branch 10 and the completely closed position of the left branch 10.

Figure 3:
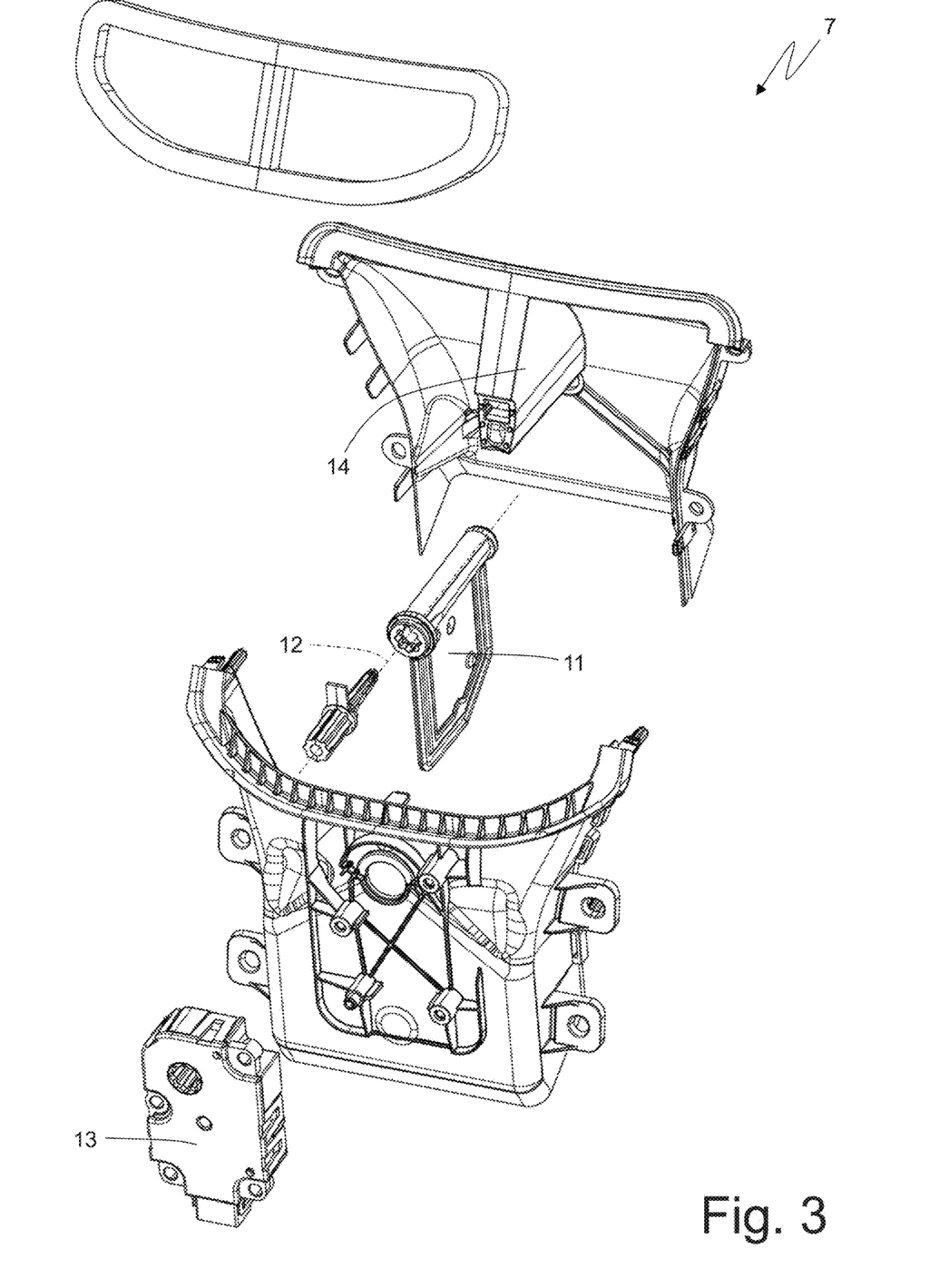
FIG. 3 is an exploded perspective view of the rear body of FIG. 2.

The air conditioning system 4 comprises an electric actuator 13 (illustrated in FIGS. 2 and 3) configured to move the blade 11 between the completely closed position of the right branch and the completely closed position of the left branch 10. According to a preferred embodiment, the electric actuator 13 is rotary and has a rotatable drive shaft that is angularly integral with a rotatable support shaft of the blade 11. In particular, the drive shaft of the electric actuator 13 may be coaxial and directly connected to the support shaft of the blade 11, or a mechanical gear transmission may be interposed between the drive shaft of the electric actuator 13 and the support shaft of the blade 11.

According to a preferred embodiment, the two branches 10 of the bifurcation 9 are separated from each other by a fixed dividing wall 14 and the blade 11 is hinged in the area of an initial end (edge) of the dividing wall 14. In particular, the dividing wall 14 is arranged downstream of the blade 11 with respect to the air flow namely it is arranged closer to the two rear air vents 6 than the blade 11.

According to a preferred embodiment, the common supply duct 8 has a vertically oriented end segment and the rotation axis 12 of the blade 11 is oriented horizontally and longitudinally (with respect to the road vehicle 1). The two branches 10 of the bifurcation 9 form a sharp bend so as to have a vertical orientation in the area of the blade 11 and a horizontal orientation in the area of the two rear air vents 6.

Figure 6:
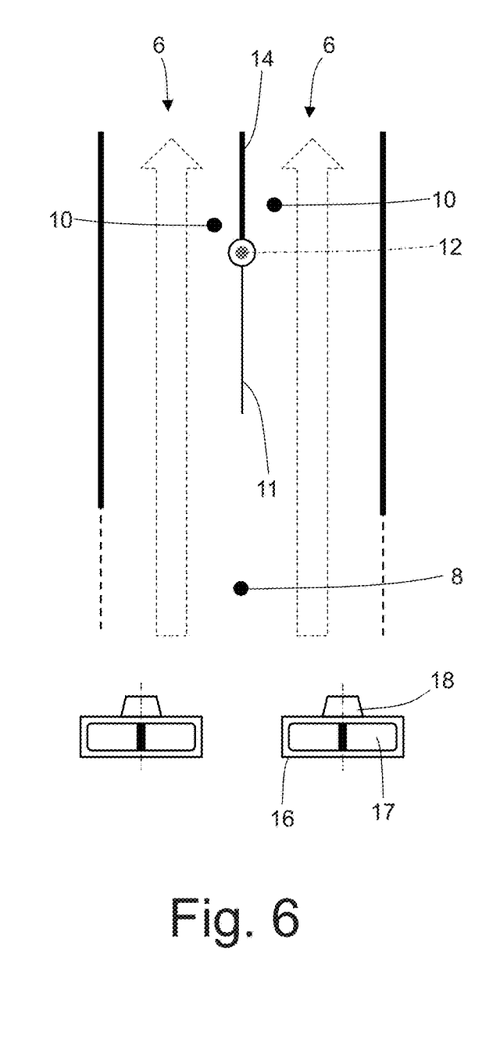
FIGS. 6, 7 and 8 schematically show three different configurations that the blade of FIG. 5 can assume during use.
Figure 7:
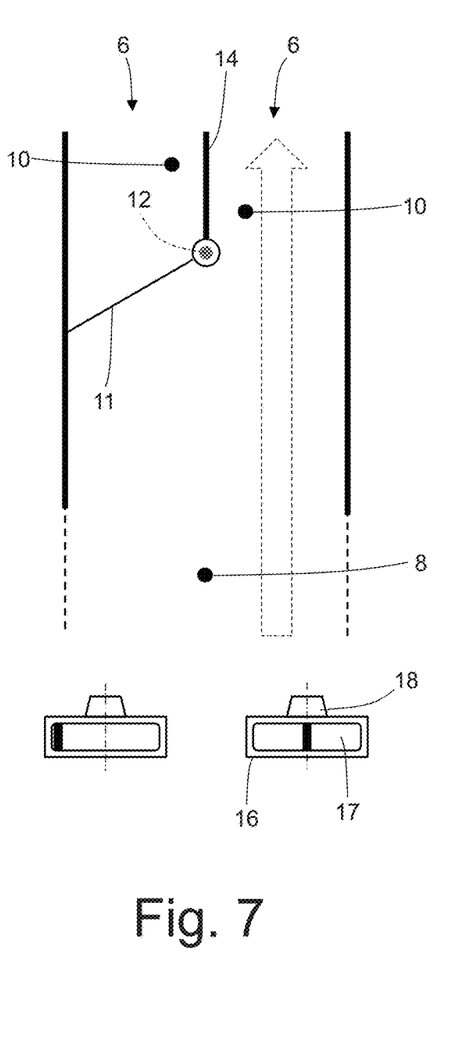
Figure 8:
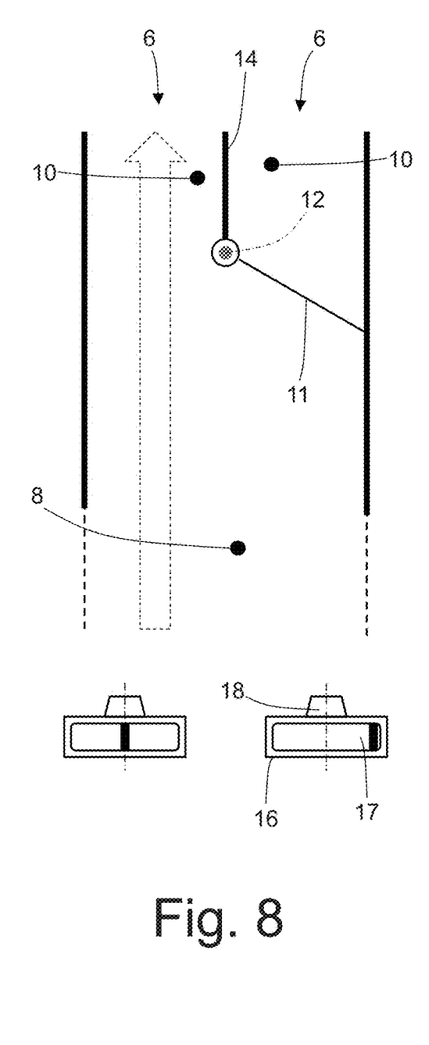

According to what is illustrated in FIG. 1, the air conditioning system 4 comprises a control unit 15 that oversees the operation of the air conditioning system 4 and, among other things, drives the electric actuator 13 to establish the position of the blade 11. According to what is illustrated in FIGS. 6, 7 and 8, two twin control devices 16 are connected to the control unit 15, each of which is associated with a corresponding rear air vent 6 (therefore, is arranged in proximity to the corresponding rear air vent 6), is manually operable by a user to request the amount of treated air that has to flow out of the rear air vent 6, and is movable between a position of lack of aeration through the rear air vent 6 and a position of maximum aeration through the rear air vent 6. The control unit 15 is configured to establish the position of the blade 11 depending on the signals provided by the two control devices 16.

According to a different embodiment not illustrated, a single control device 16 is present which is manually operable by a user to change the amount of treated air that has to flow out of the two rear air vents 6 and is movable between a left limit position in which the treated air only flows out of the left rear air vent 6 and a right limit position in which the treated air only flows out of the right rear air vent 6. Obviously, in this embodiment, the control unit 15 is configured to establish the position of the blade 11 depending on a signal provided by the single control device 16.

According to a preferred embodiment, the control unit 15 is configured to establish the position of the blade 11 according to a combination of the signals provided by the two control devices 16; in other words, a combination is calculated between the signals provided by the two control devices 16 and the result of this combination provides the position of the blade 11. If the signals of the two control devices 16 are identical (i.e., they require the same amount of air, which may also be zero), the blade 11 is positioned exactly in the centre between the two branches 10 of the bifurcation 9 (as illustrated in FIG. 6), whereas if the signals of the two control devices 16 are not identical (i.e., they require different amounts of air), the blade 11 is positioned to divert more air towards the rear air vent 6 the control device 16 of which requires a greater amount of air and therefore to divert less air towards the rear air vent 6 the control device 16 of which requires a lesser amount of air (until the branch 10 of a rear air vent 6, the control device 16 of which requires a zero amount of air as illustrated in FIGS. 7 and 8, is completely closed).

It is important to observe that, when the two signals of the two control devices 16 are identical and both require the absence of air, the blade 11 is still positioned exactly in the centre between the two branches 10 of the bifurcation 9 (as illustrated in FIG. 6) as the two signals of the two control devices 16 are identical (namely, there is no preference for one side over the other) and the absence of air is obtained upstream by acting on the air treatment unit 5 that no longer supplies air to the common supply duct 8.

According to a preferred embodiment, the control unit 15 is configured to establish a flow rate of the treated air supplied through the common supply duct 8 depending on the signals provided by the two control devices 16: if overall the signals provided by the two control devices 16 require more air, the flow rate of the treated air supplied through the common supply duct 8 is increased and vice versa.

By way of example, each control device 16 could provide a normalized signal comprised between 0 and 100, wherein 0 corresponds to the position of no air intake, and 100 corresponds to the position of maximum air intake.

According to a preferred embodiment, each control device 16 is of a rotary type and comprises a rotary knob 17 mounted rotatably between the position of lack of aeration through the corresponding rear air vent 6 and the position of maximum aeration through the corresponding rear air vent 6; a sensor 18 (an angular encoder) is provided that detects the angular position of the rotary knob 17 and transmits the angular position of the rotary knob 17 to the control unit 15.

According to a preferred embodiment, the control unit 15, the electric actuator 13 and the control devices 16 communicate with each other by means of a BUS of the road vehicle 1 which, for example, could use the low-speed single-cable serial communication protocol called LIN ("Local Interconnect Network").

The air conditioning system 4 described above has several advantages.

Firstly, the air conditioning system 4 described above allows a completely independent adjustment of the treated air introduced by the two side by side air vents 6 arranged in front of the rear seats 3.

In addition, the air conditioning system 4 described above does not pose any problems of space in the area of the transmission tunnel T since it requires the presence of a single common supply duct 8 which is arranged along the transmission tunnel T.

Finally, the air conditioning system 4 described above is also particularly compact in the area of the two side by side air vents 6 arranged in front of the rear seats 3 to the benefit of the spaciousness of the rear seats 3.

LIST OF THE REFERENCE NUMBERS OF THE FIGURES 1 automobile
2 passenger compartment 3 seats
4 air conditioning system
5 air treatment unit
6 air vents
7 rear body
8 supply duct
9 bifurcation
10 branches
11 blade
12 rotation axis
13 electric actuator
14 dividing wall
15 control unit
16 control device
17 rotary knob
18 sensor
T transmission tunnel

The invention claimed is:

1. A road vehicle (1) comprising: a passenger compartment (2) in which a transmission tunnel (T) is present, a right rear seat (3) and a left rear seat (3); and an air conditioning system (4) of the passenger compartment (2); the air conditioning system (4) comprises:
 a rear body (7) that is arranged in the centre of the passenger compartment (2) in the area of the transmission tunnel (T) and in front of the rear seats (3);
 two air vents (6) that are obtained in the rear body (7), are arranged side by side one on the right side of the passenger compartment (2) and the other on the left side of the passenger compartment (2), and are directed one towards the right rear seat (3) and the other towards the left rear seat (3);
 an air treatment unit (5) connected to the two air vents (6) in order to supply treated air to the two air vents (6);
 one single common supply duct (8), which originates from the air treatment unit (5);
 a bifurcation (9), which connects the common supply duct (8) to the two air vents (6) and has a right branch (10), which ends in a right air vent (6), and a left branch (10), which ends in a left air vent (6);
 a blade (11), which is arranged in the area of the bifurcation (9) and is movable between a completely closed position of the right branch (10) of the bifurcation (9) and a completely closed position of the left branch (10) of the bifurcation (9);
 an electric actuator (13) configured to move the blade (11) between the completely closed position of the right branch (10) and the completely closed position of the left branch (10);
 two control devices (16), each of which is associated with a corresponding air vent (6), can manually be operated by a user to request the quantity of treated air that has to flow out of the air vent (6) and is movable between a position of lack of aeration through the air vent (6) and a position of maximum aeration through the air vent (6); and
 a control unit (15) configured to establish the position of the blade (11) depending on the signals provided by the two control devices (16).

2. The road vehicle (1) according to claim 1, wherein the blade (11) is hinged so as to rotate around a rotation axis (12) between the completely closed position of the right branch (10) and the completely closed position of the left branch (10).

3. The road vehicle (1) according to claim 2, wherein the common supply duct (8) has a vertically oriented end segment and the rotation axis (12) of the blade (11) is oriented horizontally and longitudinally.

4. The road vehicle (1) according to claim 3, wherein the two branches (10) of the bifurcation (9) form a sharp bend so as to have a vertical orientation in the area of the blade (11) and a horizontal orientation in the area of the two air vents (6).

5. The road vehicle (1) according to claim 2, wherein the two branches (10) of the bifurcation (9) are separated from one another by a fixed dividing wall (14) and the blade (11) is hinged in the area of an initial end of the dividing wall (14).

6. The road vehicle (1) according to claim 5, wherein the dividing wall (14) is arranged downstream of the blade (11) relative to the air flow.

7. The road vehicle (1) according to claim 1, wherein the control unit (15) is configured to establish the position of the blade (11) depending on a combination of the signals provided by the two control devices (16) so that, if the signals are identical, the blade (11) is placed exactly at the centre between the two branches (10) of the bifurcation (9).

8. The road vehicle (1) according to claim 7, wherein the control unit (15) is configured to establish a flow rate of the treated air supplied through the common supply duct (8) depending on the signals provided by the two control devices (16).

9. The road vehicle (1) according to claim 1, wherein each control device (16) comprises: a rotary knob (17), mounted rotatably between the position of lack of aeration through the corresponding air vent (6) and the position of maximum aeration through the corresponding air vent (6); and a sensor (18), which detects the angular position of the rotary knob (17).

10. A road vehicle (1) comprising: a passenger compartment (2) in which a transmission tunnel (T) is present, a right rear seat (3) and a left rear seat (3); and an air conditioning system (4) of the passenger compartment (2); the air conditioning system (4) comprises:
 a rear body (7) that is arranged in the centre of the passenger compartment (2) in the area of the transmission tunnel (T) and in front of the rear seats (3);
 two air vents (6) that are obtained in the rear body (7), are arranged side by side one on the right side of the passenger compartment (2) and the other on the left side of the passenger compartment (2), and are directed one towards the right rear seat (3) and the other towards the left rear seat (3);
 an air treatment unit (5) connected to the two air vents (6) in order to supply treated air to the two air vents (6);
 one single common supply duct (8), which originates from the air treatment unit (5);
 a bifurcation (9), which connects the common supply duct (8) to the two air vents (6) and has a right branch (10), which ends in a right air vent (6), and a left branch (10), which ends in a left air vent (6);
 a blade (11), which is arranged in the area of the bifurcation (9) and is movable between a completely closed position of the right branch (10) of the bifurcation (9) and a completely closed position of the left branch (10) of the bifurcation (9); and
 an electric actuator (13) configured to move the blade (11) between the completely closed position of the right branch (10) and the completely closed position of the left branch (10);
 one single control device (16), which can manually be operated by a user to request the quantity of treated air that has to flow out of the two air vents (6) and is movable between a left limit position, in which the treated air only flows out of the left air vent (6), and a right limit position, in which the treated air only flows out of the right air vent (6); and a control unit (15) configured to establish the position of the blade (11) depending on a signal provided by the control device (16);

wherein the blade (11) is hinged so as to rotate around a rotation axis (12) between the completely closed position of the right branch (10) and the completely closed position of the left branch (10);

wherein the common supply duct (8) has a vertically oriented end segment and the rotation axis (12) of the blade (11) is oriented horizontally and longitudinally;

wherein the two branches (10) of the bifurcation (9) form a sharp bend so as to have a vertical orientation in the area of the blade (11) and a horizontal orientation in the area of the two air vents (6).

11. The road vehicle (1) according to claim 10, wherein the two branches (10) of the bifurcation (9) are separated from one another by a fixed dividing wall (14) and the blade (11) is hinged in the area of an initial end of the dividing wall (14).

12. The road vehicle (1) according to claim 11, wherein the dividing wall (14) is arranged downstream of the blade (11) relative to the air flow.

13. A road vehicle (1) comprising:

a passenger compartment (2) in which a transmission tunnel (T) is present, a right rear seat (3) and a left rear seat (3); and an air conditioning system (4) of the passenger compartment (2); the air conditioning system (4) comprising:

a rear body (7) that is arranged in the center of the passenger compartment (2) in the area of the transmission tunnel (T) and in front of the rear seats (3);

two air vents (6) that are obtained in the rear body (7), are arranged side by side one on the right side of the passenger compartment (2) and the other on the left side of the passenger compartment (2), and are directed one towards the right rear seat (3) and the other towards the left rear seat (3);

an air treatment unit (5) connected to the two air vents (6) in order to supply treated air to the two air vents (6); one single common supply duct (8), which originates from the air treatment unit (5);

a bifurcation (9), which connects the common supply duct (8) to the two air vents (6) and has a right branch (10), which ends in a right air vent (6), and a left branch (10), which ends in a left air vent (6);

a blade (11), which is arranged in the area of the bifurcation (9) and is movable between a completely closed position of the right branch (10) of the bifurcation (9) and a completely closed position of the left branch (10) of the bifurcation (9);

an electric actuator (13) configured to move the blade (11) between the completely closed position of the right branch (10) and the completely closed position of the left branch (10);

two control devices (16), each of which is associated with a corresponding air vent (6), can manually be operated by a user to request the quantity of treated air that has to flow out of the air vent (6) and is movable between a position of lack of aeration through the air vent (6) and a position of maximum aeration through the air vent (6); and a control unit (15) configured to establish the position of the blade (11) depending on the signals provided by the two control devices (16)

wherein the blade (11) is hinged so as to rotate around a rotation axis (12) between the completely closed position of the right branch (10) and the completely closed position of the left branch (10);

wherein the common supply duct (8) has a vertically oriented end segment and the rotation axis (12) of the blade (11) is oriented horizontally and longitudinally;

wherein the two branches (10) of the bifurcation (9) form a sharp bend so as to have a vertical orientation in the area of the blade (11) and a horizontal orientation in the area of the two air vents (6).

* * * * *